(No Model.)
E. THOMSON.
ELECTRIC METER.
No. 385,647. Patented July 3, 1888.
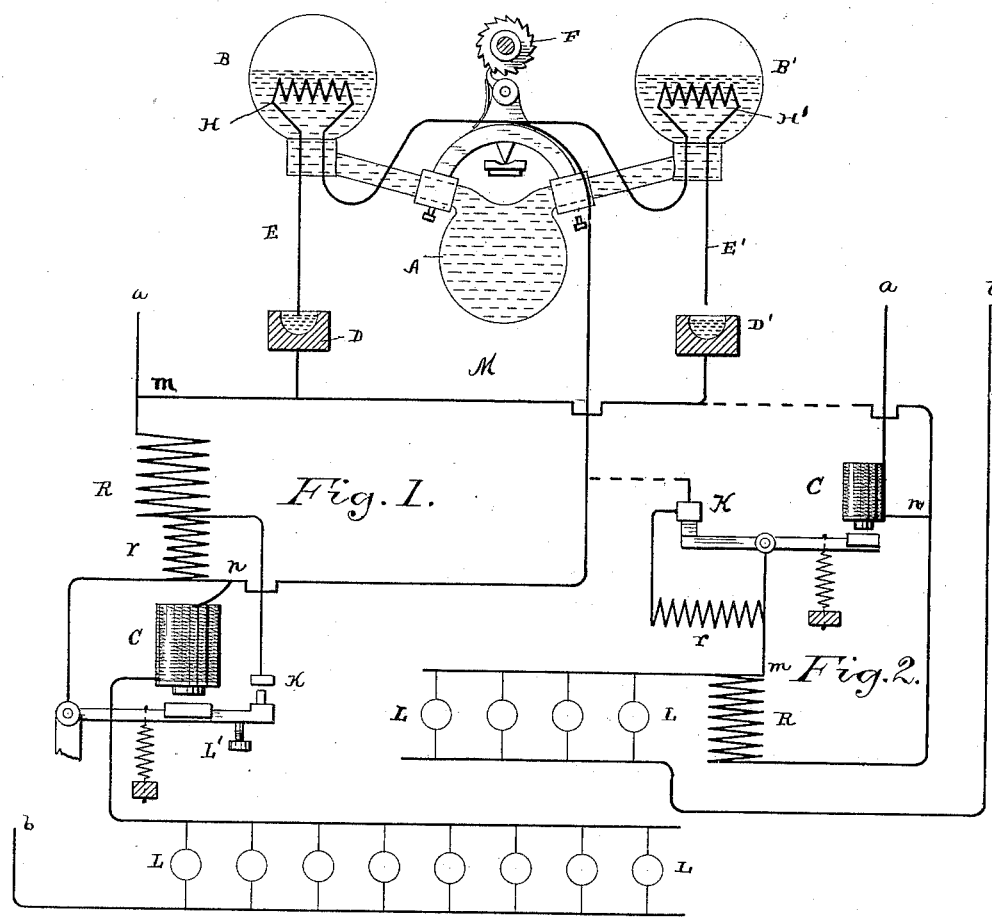
Fig. 1.
Fig. 2.
Fig. 3.
WITNESSES:
Ira R. Steward.
Wm. H. Capel.
INVENTOR.
ELIHU THOMSON.
BY
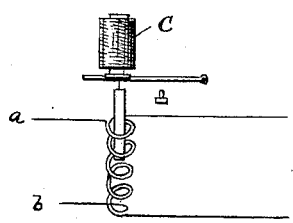
ATTORNEYS.

UNITED STATES PATENT OFFICE.

ELIHU THOMSON, OF LYNN, MASSACHUSETTS.

ELECTRIC METER.

SPECIFICATION forming part of Letters Patent No. 385,647, dated July 3, 1888.

Application filed April 6, 1888. Serial No. 269,872. (No model.)

*To all whom it may concern:*

Be it known that I, ELIHU THOMSON, a citizen of the United States, and a resident of Lynn, in the county of Essex and State of Massachusetts, have invented a certain new and useful Electric Meter, of which the following is a specification.

The object of my invention is to increase the effective range of electric meters.

In meters of considerable range constructed and connected to register accurately currents of considerable amount it is often found that when the load or current decreases and the current consumption to be measured is small there is an insensitiveness or sluggishness of the meter, resulting in much less registry than the current consumption would give if the meter responded fully and normally to the same.

My invention consists in automatically increasing the proportion of current admitted or caused to flow to the meter as the current to be measured or flowing to the same falls so as to interfere with accurate registry. To this end I propose to employ a current-controller of any desired kind properly constructed to determine or adjust the proportion or amount of current flowing to the meter, and to combine therewith an electro-magnet or other electro-responsive device connected with the circuit so as to feel the variation or decrease of current and acting to adjust or determine the movement of the current-controller so as to cause an increase in the current which affects the meter when the current or load to be measured decreases, as described.

The current-controller may be of any desired nature. One of the forms hereinafter described consists of an artificial resistance combined with a suitable switch appliance, whereby the amount of resistance in a circuit or shunt of the circuit may be varied for the purpose of varying the flow of current.

Another form of current-controller, hereinafter described, consists of an induction coil or converter, the reactive effect of which may be varied for the purpose of determining or varying the reaction between its primary and secondary, thus controlling the flow of current in the secondary to which the meter may be connected. Other forms of current-controller might be employed without departure from the essential principles of my invention. The invention contemplates the employment of any means which will serve to control the flow of current to the meter, the operation of the means for varying the current being determined by a device responsive to the variations of the electric current, as hereinafter described. A familiar form of such device is an electro-magnet; but other devices are known to electricians.

In the accompanying drawings, Figure 1 is a diagram of circuits and apparatus embodying my invention. Fig. 2 illustrates a modification in the manner of applying the variable resistance. Fig. 3 illustrates another form of current controller which might be employed in carrying out my invention.

In Fig. 1 I have illustrated the invention as applied to a form of electric meter, M, which is substantially the same as that described in a prior application for patent filed by me November 3, 1887, Serial No. 254,222.

The meter shown consists of a pivoted liquid-containing receptacle, A, partially filled with some volatile liquid, and having two bulbs or chambers, B B′, arranged at opposite sides of the fulcrum, and each provided with a heating coil or conductor, H H′, by which liquid may be volatilized, so as to produce a gas in one or the other bulb, which shall press upon the liquid and shift the same in the pivoted receptacle, so as to destroy the balance of the latter and cause a movement of the same. A continued oscillating movement is communicated to the receptacle so long as current flows to the meter by the employment of electric switches arranged to shift the current alternately from one heater to the other as the receptacle changes its position.

The heaters are suitably sealed in the bulbs or chambers B B′, and are connected with wires or conductors E E′, arranged to dip alternately in mercury-cups D D′, connected, as shown, to the circuit on which the current to be measured flows at the point $m$. The opposite terminals of the heaters are connected together and to the point $n$ of the circuit. With the meter apparatus in the position shown the volatile liquid in chamber B will be volatilized and a pressure will be produced in such chamber, which will move the liquid to the opposite side of the pivot for the receptacle, thus causing the structure to shift and to break the connection at D, while forming a connection at D' for the heater H'. The heater H' will now begin to act and will finally volatilize the liquid to a sufficient extent to cause the receptacle to tilt in the opposite direction. This movement is kept up so long as current flows and is communicated by a suitable pawl, as indicated, to the prime wheel F of the register.

R r indicate an artificial electric resistance included in the circuit a b, with a number of incandescent lamps, L L, or other translating devices, the number of which may be varied. The current on the circuit a b is that to be measured. The meter, as will be observed, forms a shunt or branch to the resistance R r, and by varying said resistance through a suitable switch the flow of current to the meter may be controlled. Thus, for instance, if the section of resistance r be normally cut out, the amount of current flowing to the meter will then be dependent upon the relative resistance of the meter and the section R; but if the resistance r be included in the circuit between m n then the flow of current to the meter will be increased. The meter branch between m n is preferably made of somewhat higher resistance than the resistance R. The section of resistance r is thrown into and out of circuit by means of a switch of any suitable construction, (indicated at K,) that is operated by means of an electro-magnet, C, included in or otherwise connected with the circuit a b, and having an armature-lever that carries one of the contacts K. The contacts K when closed form a shunt around the resistance r, so that the resistance in the shunt to the meter is that represented by R alone so long as the magnet C has sufficient power to hold its armature-lever up against the action of its retractor.

L' indicates a suitable back-stop.

The electro-responsive device consisting of magnet C is made sensitive to very small currents, and its retractor is so adjusted that only when the current in it becomes so small that the meter M loses its normal sensitiveness will the armature-lever be drawn down so as to break the contacts at K. Otherwise the magnet C holds its armature up and keeps the shunt around resistance r closed at K.

The adjustment may be such that only when the current falls to that represented in the consumption required for operating one or two of the lamps L will the magnet lose its power, so as to permit the contacts K to be opened.

The amount of resistance in r must be so adjusted that when cut out, as described, the meter M receives proper current to cause it to normally register the current of the lamps L L, according to the number in use, and only when the number falls so low that the meter is insensitive to the small current flowing in it are the contacts K opened and additional current sent to M by virtue of the insertion of r into circuit with R.

Assuming, for instance, that there are three lamps in use at L L or a greater number, the electro-magnet C will hold its armature up and keep the contacts closed at K. The resistance r will then be shunted, leaving the total artificial resistance between m n such that the current will flow to the meter in the branch in less amount than is the case when the shunt is opened. The meter is properly constructed to register with the amount of current, determined by the resistance R and the number of lamps or other devices in circuit corresponding to three or a greater number. Assuming but one lamp in circuit, the lever of magnet C will remain down, the contacts K being thus opened. The resistance in the shunt to the meter is thereby increased, and such a division of current is caused through meter M as is necessary to cause the same to properly operate and to register.

By the means described the meter M may be constructed to have a larger range than would otherwise be possible, since if made sensitive to one lamp normally its range would ordinarily be curtailed, while if made so coarsely as to begin normal registry with a current corresponding to one or two lamps in use, (assuming sixteen-candle-power lamps, for example,) it will have two or three times the range upward in number of lamps for which it can register properly.

In the arrangement shown in Fig. 2 the meter is supposed to be in a branch of the main circuit taken from the points m n around the artificial resistance R; but the control of the flow of current to the meter is determined by adjusting the resistance r in the meter branch. In this case the resistance of the meter branch is increased under those conditions which in the arrangement of Fig. 1 produce a decrease of resistance in the circuit between m n, including R r.

In Fig. 2 the resistance r is in the meter branch and the contacts K, forming a shunt around the same, are normally kept open by the action of the magnet C so long as a current of the proper strength flows. The flow of current to the meter is thereby kept down. When the current to be measured decreases, as before explained, the contacts K are closed, owing to the magnet C decreasing in power, and the flow of current in the meter branch is thereby increased.

As before stated, I do not limit myself to the construction of current-controller.

A form that might be employed is indicated in Fig. 3, where the controlling-magnet is shown as supporting a movable core for an induction-coil, the primary of which carries the current to be measured, while the secondary connects to the meter. In this case it is of course to be understood that the primary current is a varying or alternating one. The depth or variation of immersion of the core within the primary and secondary coils evidently determines the amount of current flowing in the secondary with any given current flow on the circuit $a\,b$. The effect is, as before, to increase the current flow to the meter when the magnet C decreases in power.

What I claim as my invention is—

The combination, with an electric meter, of a current-controller governing the flow of current to the same and a controller-magnet or other electro-responsive device adjusted, as described, to permit an increase in the flow of current to the meter when the current to be measured falls below that to which the meter responds normally, as and for the purpose described.

Signed at Lynn, in the county of Essex and State of Massachusetts, this 29th day of March, A. D. 1888.

ELIHU THOMSON.

Witnesses:
    J. W. GIBBONEY,
    G. E. EMMONS.